(12) United States Patent
Kuwayama et al.

(10) Patent No.: US 10,166,817 B2
(45) Date of Patent: Jan. 1, 2019

(54) PNEUMATIC TIRE

(71) Applicant: BRIDGESTONE CORPORATION, Tokyo (JP)

(72) Inventors: Isao Kuwayama, Kodaira (JP); Shintaro Hatanaka, Kodaira (JP); Kentaro Kozuki, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 96 days.

(21) Appl. No.: 15/302,216

(22) PCT Filed: Apr. 14, 2015

(86) PCT No.: PCT/JP2015/002068
§ 371 (c)(1),
(2) Date: Oct. 6, 2016

(87) PCT Pub. No.: WO2015/159538
PCT Pub. Date: Oct. 22, 2015

(65) Prior Publication Data
US 2017/0028788 A1    Feb. 2, 2017

(30) Foreign Application Priority Data
Apr. 14, 2014    (JP) .................................. 2014-082998

(51) Int. Cl.
*B60C 5/14* (2006.01)
*B60C 9/20* (2006.01)
(Continued)

(52) U.S. Cl.
CPC .................. *B60C 9/20* (2013.01); *B60C 3/04* (2013.01); *B60C 5/14* (2013.01); *B60C 5/142* (2013.01);
(Continued)

(58) Field of Classification Search
CPC .... B60C 9/20; B60C 9/30; B60C 9/22; B60C 9/2009; B60C 9/28; B60C 2009/2016;
(Continued)

(56) References Cited

U.S. PATENT DOCUMENTS

| 2009/0211685 A1 | 8/2009 | Kabe et al. |
| 2014/0158263 A1 | 6/2014 | Hatanaka et al. |
| 2015/0122392 A1* | 5/2015 | Kozuki ..................... B60C 9/22 |
| | | 152/454 |

FOREIGN PATENT DOCUMENTS

| CN | 101203391 A | 6/2008 |
| CN | 102398476 A | 4/2012 |

(Continued)

OTHER PUBLICATIONS

Machine translation of JP2009-248965 (no date).*
(Continued)

*Primary Examiner* — Justin R Fischer
*Assistant Examiner* — Philip N Schwartz
(74) *Attorney, Agent, or Firm* — Sughrue Mion, PLLC

(57) ABSTRACT

To reduce noise while suppressing increase in rolling resistance, without affecting the formation of a carcass line, provided is a pneumatic tire (10) including: a carcass (13); an inclined belt (14), and an inner liner (17). The inclined belt (14) is disposed on the tire radial outer side of the crown portion of the carcass (13). The inclined belt (14) includes at least one inclined belt layer (16). The inclined belt layer (16) has cords extending as being inclined at 35° or more with respect to the tire circumferential direction. The inner liner (17) has a thickness of 1.5 mm or more at least in part of a side portion (19).

15 Claims, 10 Drawing Sheets

(51) Int. Cl.
- *B60C 3/04* (2006.01)
- *B60C 11/03* (2006.01)
- *B60C 15/00* (2006.01)
- *B60C 9/22* (2006.01)
- *B60C 9/30* (2006.01)
- *B60C 19/00* (2006.01)
- *B60C 9/28* (2006.01)
- *B60C 11/00* (2006.01)
- *B60C 13/00* (2006.01)

(52) U.S. Cl.
CPC .............. *B60C 9/2009* (2013.01); *B60C 9/22* (2013.01); *B60C 9/28* (2013.01); *B60C 9/30* (2013.01); *B60C 11/033* (2013.01); *B60C 15/00* (2013.01); *B60C 19/002* (2013.01); B60C 2009/2016 (2013.01); B60C 2009/2019 (2013.01); B60C 2009/2022 (2013.01); B60C 2009/2223 (2013.01); B60C 2009/2228 (2013.01); B60C 2011/0025 (2013.01); B60C 2011/0381 (2013.01); B60C 2013/007 (2013.01)

(58) Field of Classification Search
CPC .... B60C 2009/2019; B60C 2009/2022; B60C 2009/2223; B60C 2009/2228; B60C 19/002; B60C 5/14; B60C 5/142; B60C 3/04; B60C 11/033; B60C 2011/0025; B60C 2011/0381; B60C 2013/007; B60C 15/00

See application file for complete search history.

(56) References Cited

FOREIGN PATENT DOCUMENTS

| | | |
|---|---|---|
| CN | 103717407 A | 4/2014 |
| CN | 106170400 A | 11/2016 |
| EP | 2682279 A1 | 1/2014 |
| EP | 2 842 765 A1 | 3/2015 |
| EP | 3115227 A1 | 1/2017 |
| JP | 11-59120 A | 3/1999 |
| JP | 2007-45334 A | 2/2007 |
| JP | 2007-182123 A | 7/2007 |
| JP | 2009-248965 A | 10/2009 |
| JP | 2013-147094 A | 8/2013 |
| WO | 2013/161296 A1 | 10/2013 |

OTHER PUBLICATIONS

International Search Report for PCT/JP2015/002068 dated Jun. 9, 2015.

Communication dated Dec. 18, 2018, from the State Intellectual Property Office of People's Republic of China in counterpart Application No. 201580019752.5.

* cited by examiner

WIDE GROUND CONTACT SHAPE

NARROW GROUND CONTACT SHAPE

PNEUMATIC TIRE

CROSS REFERENCE TO RELATED APPLICATIONS

This application is a National Stage of International Application No. PCT/JP2015/002068 filed Apr. 14, 2015, claiming priority based on Japanese Patent Application No. 2014-082998 filed Apr. 14, 2014, the contents of all of which are incorporated herein by reference in their entirety.

TECHNICAL FIELD

A pneumatic tire is disclosed.

BACKGROUND

In recent years, vehicles have been demanded to have improved silence, and tires are required to cause reduced noise whilst maintaining various performances such as rolling resistance needed therefor. For example, noise may be reduced in a pneumatic tire which includes, between the carcass layer and the belt layer provided in the tread portion, a rubber layer disposed at a position intersecting the tire equator plane, so as to shift the frequency range of the cross-sectional secondary vibration mode to the lower frequency side (see JP2007-182123A (PTL 1)).

CITATION LIST

Patent Literature

PTL 1: JP2007-182123A

SUMMARY

Technical Problem

However, additionally providing a rubber layer between the carcass layer and the belt layer as in PTL 1 is likely to affect the formation of a desired carcass line, and thus the configuration of PTL 1 has been unsuitable to some tires.

It could therefore be helpful to provide a tire capable reducing noise without affecting the carcass line, and also of suppressing increase in rolling resistance.

Solution to Problem

In light of the above, the disclosed pneumatic tire includes: a carcass extending across a pair of bead portions; an inclined belt which is disposed on the tire radial outer side of a crown portion of the carcass and includes at least one layer of inclined belt layers each having cords extending as being inclined with respect to the tire circumferential direction; and an inner liner disposed on the inside of the carcass, in which the inner liner has a thickness of 1.5 mm or more at least in part of a side portion of the tire; and the inclined belt layers include at least one inclined belt layer that has cords inclined at an inclination angle of 35° or more with respect to the tire circumferential direction. The disclosed tire, which includes an inner liner having a thickness equal to or larger than the aforementioned lower limit, is capable of reducing tire noise. Further, the disclosed tire, which is increased in thickness of the inner liner, does not affect the carcass line. The disclosed tire also includes an inclined belt layer having cords inclined at 35° or more with respect to the tire circumferential direction, which suppresses increase in rolling resistance.

Further, in the disclosed tire, the inner liner may preferably have a thickness of 2.8 mm or less. This configuration reliably suppresses increase in rolling resistance.

Further, in the disclosed tire, the inner liner has, at least in part of the side portion, a thickness which may preferably be larger than the thickness thereof in the rest of the side portion. This configuration can further reduce tire noise.

Further, in the disclosed tire, the inclined belt has at least two layers of the inclined belt layers different in width in the tire width direction, of which the widest inclined belt layer has cords inclined at an inclination angle $\theta_1$ with respect to the tire circumferential direction and the narrowest inclined belt layer has cords inclined at an inclination angle $\theta_2$ with respect to the tire circumferential direction, the inclination angles $\theta_1$ and $\theta_2$ preferably satisfying: $35° \leq \theta_1 \leq 85°$; and $10° \leq \theta_2 \leq 30°$, and the widest inclined belt layer has a tire widthwise width $W_1$ and the narrowest inclined belt layer has a tire widthwise width $W_2$, the width $W_1$ and $W_2$ preferably satisfying: $W_2 \leq 0.6 \times W_1$. This configuration allows for further reducing tire noise.

Further, the disclosed tire further includes a circumferential belt which is disposed on the tire radial outer side of a crown portion of the carcass and includes at least one circumferential belt layer having cords extending along the tire circumferential direction, in which the circumferential belt may preferably has a tire circumferential rigidity per unit width that is higher in a central region including the tire equator plane, than the tire circumferential rigidity per unit width in other regions. This configuration allows for further reducing tire noise.

Advantageous Effect

The disclosed tire configured as above is capable reducing in-vehicle noise of 80 Hz to 100 Hz without affecting the carcass line, and also of suppressing increase in rolling resistance.

DETAILED DESCRIPTION

Hereinafter, embodiments of the disclosed pneumatic tire are described with reference to the accompanying drawings.

Figure 1:
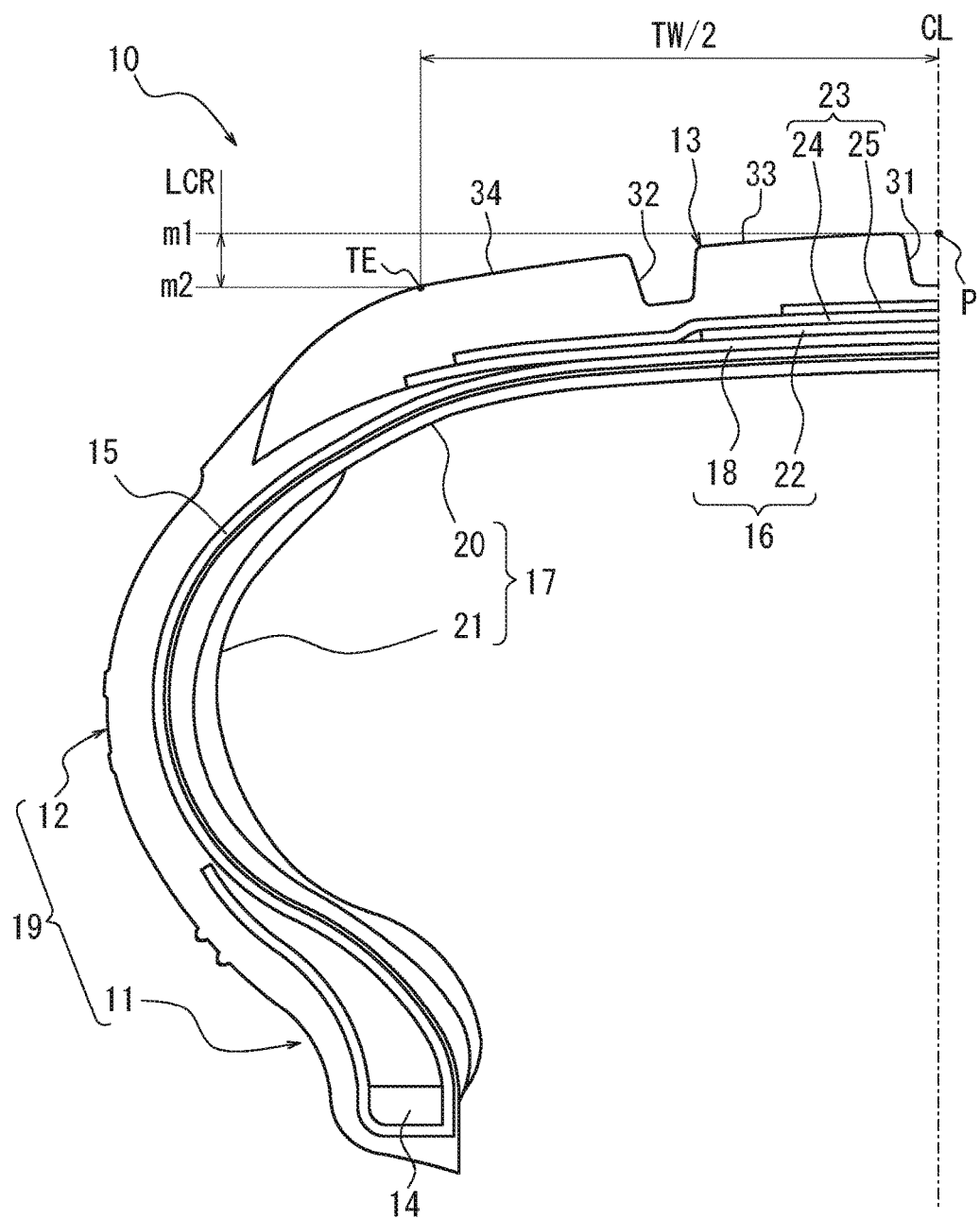
FIG. 1 is a partial sectional view in the tire width direction of the disclosed tire according to an embodiment.

First, the disclosed pneumatic tire according to an embodiment is described. FIG. 1 is a partial sectional view in the tire width direction of a one-side half of the disclosed tire, where the tire is mounted on a rim, filled with an internal pressure of 300 kPa, in a no-load state where no load is applied thereon. The "rim" herein refers to a standard rim in an applicable size (such as Measuring Rim in STANDARDS MANUAL of ETRTO, Design Rim in YEAR BOOK of TRA) recited in industrial standards effective in a region where the tire is manufactured and used, for example, JATMA YEAR BOOK published by the Japan Automobile Tire Manufacturers Association, Inc. (JATMA) in Japan, in STANDARDS MANUAL of the European Tire and Rim Technological Organization (ETRTO) in Europe, and in YEAR BOOK of the Tire and Rim Association, Inc. (TRA) in the US.

As illustrated in FIG. 1, the disclosed pneumatic tire 10 according to this embodiment is composed of a pair of bead portions 11, a sidewall portion 12 continuing from the bead portion 11, and a tread portion 13 coupling the sidewall portions 12 on both sides. The pneumatic tire 10 further includes: a carcass 15 composed of a ply of radially-arranged cords extending toroidally across a pair of bead cores 14 embedded in the pair of bead portions 11; an inclined belt 16 disposed outside in the tire radial direction in the crown portion of the carcass 15; and an inner liner 17 disposed inside the carcass 15.

The inner liner 17 has a thickness of 1.5 mm or more at least in part of the side portion 19 formed of the bead portion 11 and the sidewall portion 12. Here, the thickness of the inner liner 17 refers to a thickness of the thinnest site of the inner liner 17. In this embodiment, the inner liner 17 has a thickness of 1.5 mm or more throughout the entire region in a width-direction section. Further, FIG. 1 illustrates the thickness of the inner liner 17 (i.e., a first inner liner rubber 20 and a second inner liner rubber 21 to be described later) to be slightly thicker than in reality for the sake of emphasis and clarity.

Figure 2:
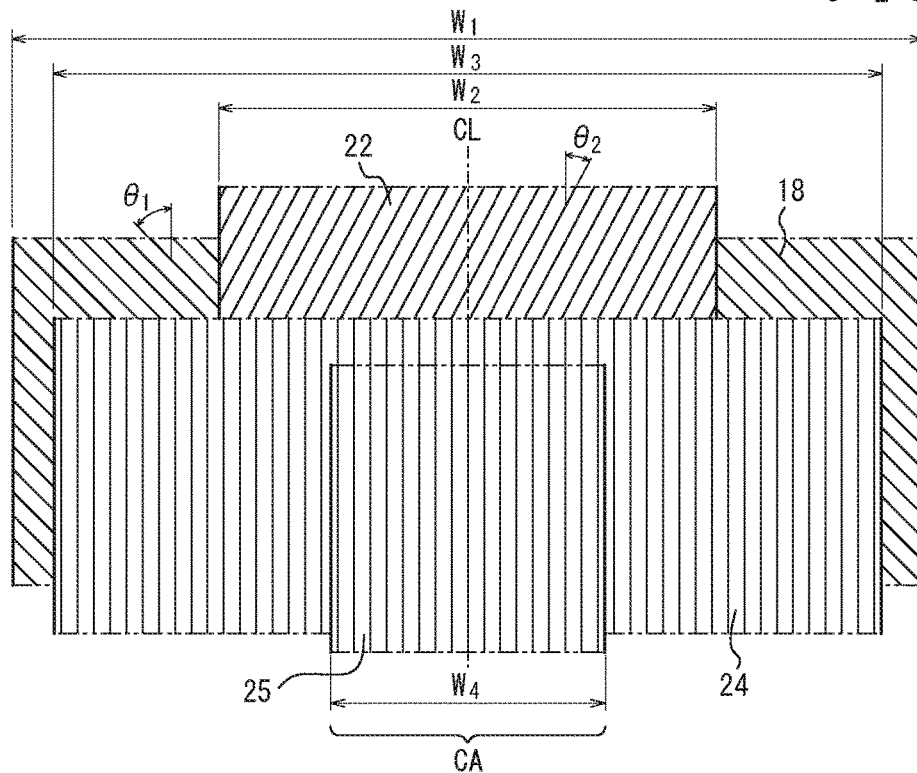
FIG. 2 is a plan view illustrating a belt structure of the tire of FIG. 1.

The inclined belt 16 has inclined belt layers 18, 22 extending as inclined with respect to the tire circumferential direction. Of the inclined belt layers 18 and 22, the inclined belt layer 18 as at least one of the layers has cords inclined at an inclination angle of 35° or larger relative to the tire circumferential direction, as illustrated in FIG. 2.

The aforementioned configuration allows for suppressing noise without affecting the formation of a carcass line, as will be described later.

The inner liner 17 may thus be thickened to improve the effect of attenuating tire vibration in the cross-sectional primary vibration mode. Thus, the inner liner 17 of at least 1.5 mm thick may be disposed as described above, so as to suppress vibration in the cross-sectional primary vibration mode which may otherwise constitute a major cause of tire noise, to thereby achieve noise reduction in the pneumatic tire 10. Further, among the components of the tire, the inner liner 17 alone is thickened, which prevents the carcass line from being affected as the inner liner 17 is disposed on the inside of the carcass 15. Further, the inner liner is an existing tire member, which means that noise reduction can be achieved without increasing the number of members.

Meanwhile, in the current tire products development, the inner liner is generally required to be reduced in thickness, within a range satisfying the required air permeability, in order to suppress loss to occur in the inner liner and to improve rolling resistance.

In the process of designing the disclosed tire, it was also anticipated that the rolling resistance may increase due to the thickened inner liner. However, in the disclosed configuration, the inner liner is combined with cords structure inclined 35° or more with respect to the tire circumferential direction, which suppresses contraction in the tire width direction, to thereby suppress deformation in the tire width direction (wiping deformation) to occur at the ground contact of the tread portion 13. Accordingly, the inner liner can be thickened while suppressing increase in rolling resistance resulting from the increase of loss in the inner liner.

Further, in this embodiment, the thickness of the inner liner 17 is defined to be 2.8 mm or less.

The aforementioned use of the inner liner 17 of 2.8 mm thick or less sets an upper limit on the weight of the inner liner 17, allowing for reliably suppressing increase in rolling resistance.

Here, from the same perspective as above, the inner liner 17 may more preferably have a thickness of 1.6 mm or more and 2.4 mm or less, and further preferably of 1.8 mm or more and 2.2 mm or less.

Further, in this embodiment, the inner liner 17 is increased in thickness at least in part of a section starting from the side portion 19 to a portion where the tire-widthwise belt end of the inclined belt 16 is arranged, as compared with the thickness thereof in the rest of the section. Here, the section of the inner liner 17 in the side portion 19 refers to a section starting from the tire-radial inner end of the bead portion 11 to the tire-widthwise end where the tire-widthwise belt end of the inclined belt 16 is arranged, on the inner surface side of the side portion 19. For example, on the further inside of the first inner liner rubber 20 having a uniform thickness, the second inner liner rubber 21 may further be disposed as another inner liner rubber, to thereby increase the thickness of the inner liner 17 at least in part of the side portion 19, as compared with the thickness thereof in the rest of the section.

In the aforementioned configuration, the inner liner 17 is further thickened only in a portion that largely contributes to suppressing tire vibration in the sectional first-order vibration mode, which can further reduce noise while suppressing increase in weight of the inner liner 17.

Further, in this embodiment, the inclined belt 16 includes the two inclined belt layers 18, 22 different from each other in width in the tire width direction (see FIG. 2). Of the inclined belt layers, the inclined belt layer 18 as the widest layer is formed of cords inclined at an inclination angle $\theta_1$ with respect to the tire circumferential direction, while the inclined belt layer 22 as the narrowest layer is formed of cords inclined at an inclination angle $\theta_2$ with respect to the tire circumferential direction, the inclination angles $\theta_1$ and $\theta_2$ each satisfying $35° \leq \theta_1 \leq 85°$ and $10° \leq \theta_2 \leq 30$, respectively. Further, the widest inclined belt layer 18 has a tire widthwise width $W_1$ and the narrowest inclined belt layer 22 has a tire widthwise width $W_2$, which satisfy $W_2 \leq 0.6 \times W_1$.

The aforementioned configuration allows for further suppressing noise as discussed in below. As has been already described, the inner liner 17 thus thickened suppresses vibration in the sectional first-order vibration mode mainly in a low frequency range of 80 Hz to 100 Hz. However, the widest inclined belt layer 18 includes cords which are inclined 35° or more with respect to the tire circumferential direction, which would lead to an increase in vibration of another vibration mode such as a sectional second-order vibration mode in a high frequency range of 400 Hz to 600 Hz. In light thereof, the narrowest inclined belt layer 22 is provided, which has the aforementioned inclined angle and the tire widthwise width, to thereby maintain a reasonable out-of-plane flexural rigidity in the tire circumferential direction near the tire equator plane CL, allowing for suppressing vibration of the tread surface in the aforementioned vibration mode. Therefore, the aforementioned configuration which includes the narrowest inclined belt layer 22 allows for reducing noise in high frequency range as well as in low frequency range.

Further, in this embodiment, the pneumatic tire 10 further includes a circumferential belt 23 disposed on the tire radial outer side of the inclined belt 16 in the tread portion 13, that is, on the tire radial outer side of the crown portion of the carcass 15. The circumferential belt 23 is composed of at least one circumferential belt layer having cords extending along the tire circumferential direction. Here, the "cords extending along the tire circumferential direction" refer to cords extending parallel to the tire circumferential direction, and also refer to rubber-coated cords configured as a strip which may be slightly inclined with respect to the tire circumferential direction (at an inclination angle of about 5° with respect to the tire circumferential direction) when spirally wounded.

The circumferential belt 23 has a tire circumferential rigidity per unit width higher in a central region CA including the tire equator plane CL, than the tire circumferential rigidity per unit width in other regions. The central region CA has a width $W_4$ which is 0.2 times or more and 0.6 times or less of a width $W_3$ of the circumferential belt 23, i.e., a circumferential belt layer 24 as the widest layer, with the tire equator plane CL being the center. That is, the widths $W_3$ and $W_4$ satisfy $0.2 \times W_3 \leq W_4 \leq 0.6 \times W_3$.

For example, in the circumferential belt 23, the widest circumferential belt layer 24 and a narrowest circumferential belt layer 25, which are different from each other in tire radial width, may be arranged as being laminated each other in the central region CA including the tire equator plane CL, to thereby allow the central region CA to have a tire circumferential rigidity per unit width higher than the tire circumferential rigidity per unit width in other regions.

Figure 3:
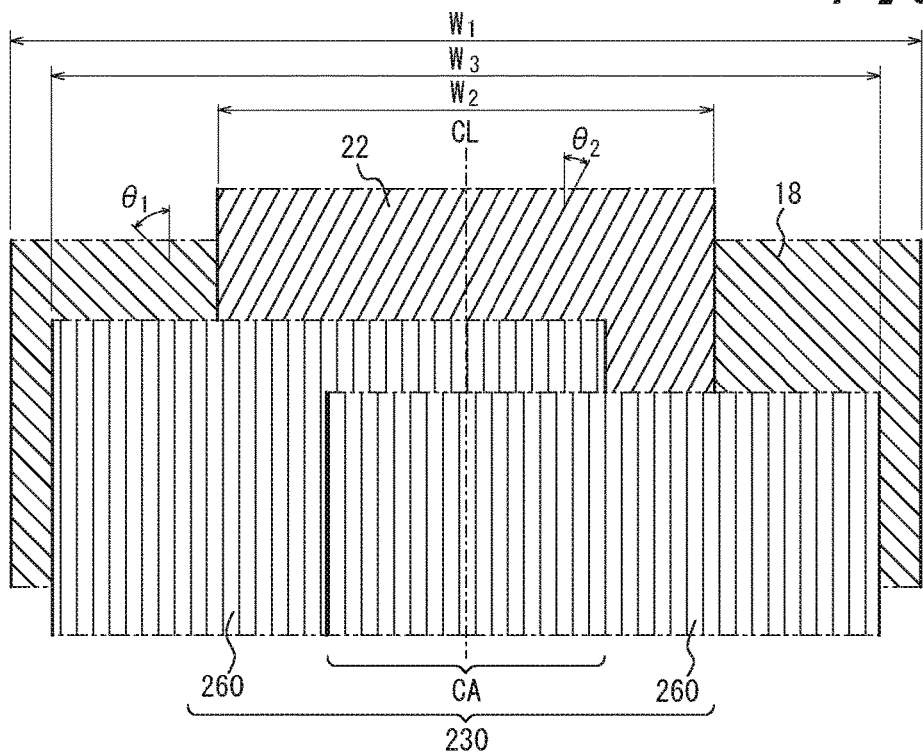
FIG. 3 is a plan view illustrating another belt structure in a first modified example of the tire of FIG. 1.

Further, for example, as illustrated in FIG. 3, in a circumferential belt 230, two circumferential belt layers 260 may be arranged to be laminated each other only in the central region CA, to thereby allow the central region CA to have a tire circumferential rigidity per unit width higher than the tire circumferential rigidity per unit width in other regions.

Further, in the circumferential belt 23, for example, the number of cords or the number of twists of cords forming the circumferential belt layer 25 may be locally increased so that the rigidity of the cords in the central region CA can be increased, to thereby allow the central region CA to have a tire circumferential rigidity per unit width higher than the tire circumferential rigidity per unit width in other regions.

The aforementioned configuration allows for further reducing noise, as described in below. As has already been described, the inner liner 17 may be thickened to suppress vibration in the sectional first-order vibration mode mainly in a low frequency range of 80 Hz to 100 Hz. However, vibration in another vibration mode such as sectional second-order vibration mode in a high frequency range of 400 Hz to 600 Hz would still be increased due to the widest inclined belt layer 18 including cords which are inclined 35° or more with respect to the tire circumferential direction. In light thereof, the circumferential belts 23, 230 having the aforementioned rigidity may be provided, so that the widthwise center of the tread portion is less likely to be widened in the circumferential direction, suppressing the widening of the tread surface in the circumferential direction, allowing for suppressing vibration of the tread surface in the aforementioned vibration mode.

Therefore, the aforementioned configuration which includes the circumferential belts 23, 230 configured as above allows for reducing noise in high frequency range as well as in low frequency range.

Figure 4:
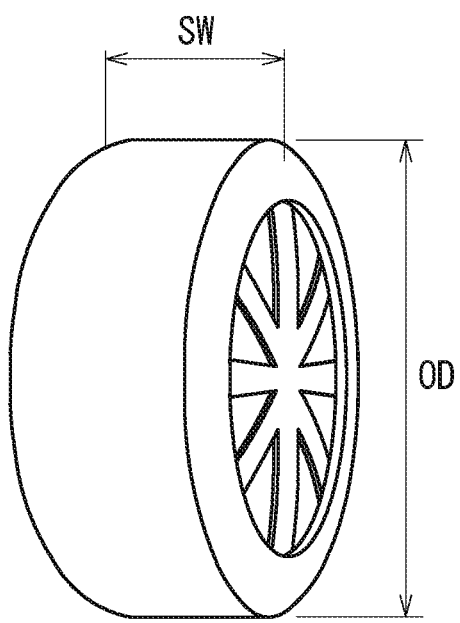
FIG. 4 illustrates the section width and the outer diameter of the tire of FIG. 1.

Further, in this embodiment, the pneumatic tire 10 has a section width SW and an outer diameter OD as shown in FIG. 4, which satisfy the following relation when the internal pressure is defined to be 250 kPa or higher. That is, when the section width SW of the pneumatic tire 10 is less than 165 mm, SW/OD is 0.26 or less. Meanwhile, when the section width SW of the pneumatic tire is 165 mm or larger, the outer diameter OD satisfies $OD \geq 2.135 \times SW + 282.3$.

The pneumatic tire 10 of this embodiment is a narrow-width, large-diameter tire having the section width SW and the outer diameter OD satisfying the aforementioned relation, which allows for suppressing deformation of the tread portion 13 in the tire width direction at the ground contact thereof and also for suppressing eccentric deformation. Accordingly, as compared with a normal size tire, a narrow-width, large-diameter tire having the section width SW and the outer diameter OD satisfying the aforementioned relation can further suppress increase in rolling resistance while increasing the thickness of the inner liner.

Further, in this embodiment, a rubber composition forming the inner liner 17 has an air permeability coefficient of $1.0 \times 10^{-14}$ cc·cm/(cm$^2$·s·cmHg) or more and $6.5 \times 10^{-10}$ cccm/(cm$^2$·s·cmHg) or less. This configuration allows for suppressing increase in weight and production cost while keeping the high air barrier property of the inner liner 17 and maintaining high the internal pressure of the tire.

Further, in this embodiment, the inner liner 17 is formed of a rubber composition with a dynamic storage elastic modulus E' at −40° C. of 500 MPa or higher and 8000 MPa or lower. This configuration allows for providing sufficient moldability in the tire while preventing cracking of the inner liner 17 at low temperature.

Further, in this embodiment, the rubber composition forming the inner liner 17 has a loss tangent (tan δ) of 0.1 or more and 0.3 or less. This configuration allows for maintaining elasticity and for suppressing loss increase.

Further, in this embodiment, the inner liner 17 may have a uniform thickness as a whole. Further, in this embodiment, the narrowest inclined belt layer 22 is disposed on the outer circumferential side of the widest inclined belt layer 18.

Additionally, in this embodiment, X defined as $X = Y \times m \times n$ is 750 or larger, where Y represents Young's modulus (GPa) of the cords of the circumferential belt layer, m represents the number of the circumferential belt layers, and n represents the number of the cords per 50 mm. Further, X may preferably be 800 or more, and further preferably be 900 or more. Further, X may still preferably be 1500 or less.

In the aforementioned configuration, the circumferential belt 23 is high in circumferential rigidity, which can suppress tire circumferential deformation of the tread portion 13 at the ground contact and tire widthwise deformation (wiping deformation) along therewith. Accordingly, increase in rolling resistance resulting from tire deformation can be suppressed.

The tire size of the pneumatic tire 10 of this embodiment may be specifically exemplified as: 105/50R16, 115/50R17, 125/55R20, 125/60R18, 125/65R19, 135/45R21, 135/55R20, 135/60R17, 135/60R18, 135/60R19, 135/65R19, 145/45R21, 145/55R20, 145/60R16, 145/60R17, 145/60R18, 145/60R19, 145/65R19, 155/45R18, 155/45R21, 155/55R18, 155/55R19, 155/55R21, 155/60R17, 155/65R13, 155/65R18, 155/70R17, 155/70R19, 165/45R22, 165/55R16, 165/55R18, 165/55R19, 165/55R20, 165/55R21, 165/60R19, 165/65R19, 165/70R18, 175/45R23, 175/55R18, 175/55R19, 175/55R20, 175/55R22, 175/60R18, 175/65R15, 185/45R22, 185/50R16, 185/50R20, 185/55R19, 185/55R20, 185/60R17, 185/60R19, 185/60R20, 195/50R20, 195/55R20, 195/60R19, 195/65R17, 205/50R21, 205/55R16, 205/55R20, 205/60R16, 205/60R18, 215/50R21, 215/60R17, 225/65R17.

The pneumatic tire 10 of this embodiment may preferably be used with high internal pressure. Specifically, the tire 10 may preferably have an internal pressure of 250 kPa or higher. The tire with the internal pressure of 250 kPa or higher can suppress increase of the contact length, which is otherwise likely to increase, to thereby reduce the amount of deformation of the tread rubber and further reduce the rolling resistance.

Here, in the pneumatic tire 10 of this embodiment, the amount of grooves in the tread may preferably be reduced in consideration of the balance between the wet performance and other performances. Specifically, the groove volume ratio (groove volume V2/tread rubber volume V1) may preferably be 20% or less, and the negative ratio (the ratio of the groove area to the tread surface area) may preferably be 20% or less. Those values are smaller than standard values in a pneumatic tire of a conventional size.

Figure 5A:
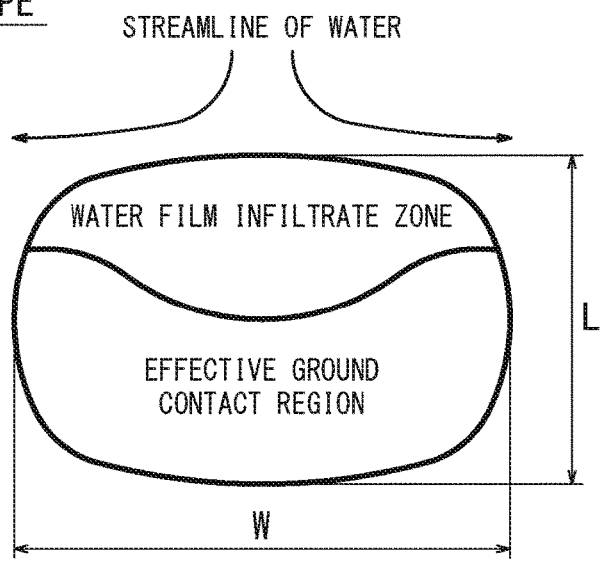
FIG. 5A is for illustrating the wet performance of a wide tire.
Figure 5B:
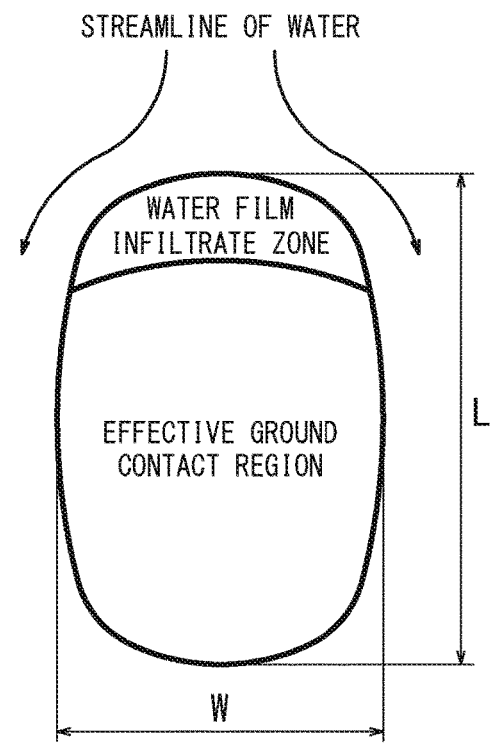
FIG. 5B is for illustrating the wet performance of a narrow tire.

A general idea provides that the groove amount should be increased to improve wet performance. However, as illustrated in FIG. 5B by comparison with FIG. 5A, the pneumatic tire 10 of this embodiment, which is in a narrow-width, large-diameter size, is reduced in the contact surface width W, which allows water to be readily drained in the tire width direction. This means that the groove amount can be reduced without impairing the wet performance; rather, the land portion rigidity is improved, which leads to improving other performances such as cornering power.

Here, the groove volume ratio is defined as the ratio of V2/V1, in which V1 represents the volume of the tread rubber disposed on the tire widthwise inner side than the both ends in the width direction of a maximum width inclined belt layer having the maximum width in the tire width direction of the inclined belt layers forming the inclined belt 16, while being on the tire radial outer side than a reinforcing member (the narrowest circumferential belt layer 25 in the example of FIG. 1) on the tire radial outermost side at the tire widthwise center position, and V2 stands for the total volume of grooves formed in the tread surface.

Figure 6:
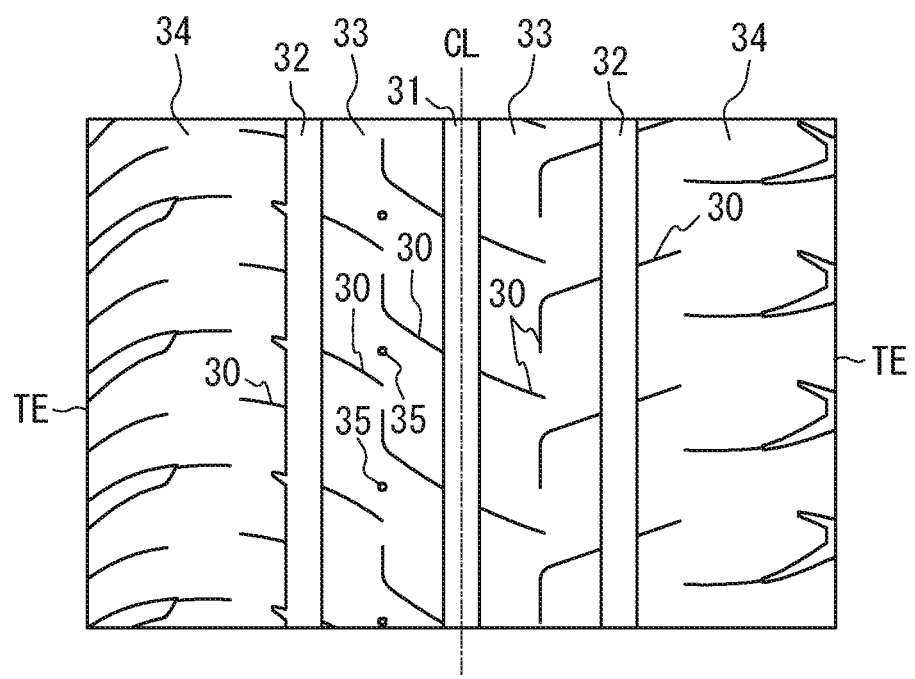
FIG. 6 is a development elevation illustrating a first example of a tread pattern of the disclosed tire according to an embodiment.

The pneumatic tire 10 of this embodiment may preferably have a tread pattern, for example, as illustrated in the example of FIG. 6, mainly composed of rib-like land portions 33, 34 which are each partitioned in the tire width direction by two circumferential grooves 31, 32 or by the circumferential groove 32 and a tread end TE. Here, the rib-like land portions 33, 34 refer to land portions extending in the tire circumferential direction without having any widthwise grooves traversing in the tire width direction. However, the rib-like land portions 33, 34 may include sipes and other widthwise grooves terminating within the rib-like land portions. This is in contrast to a standard pneumatic tire of a conventional size which often employs a pattern having widthwise grooves for improving wet performance.

This can be considered attributable to that the pneumatic tire 10 of this embodiment is narrow in the contact width and has a high contact pressure particularly in the use under a high internal pressure (of, for example, 250 kPa or more), and thus, grounding performance on a wet road can be improved when circumferential shearing rigidity is increased.

As illustrated in the example of FIG. 6, in a tread pattern mainly composed of the rib-like land portions 33, 34, the tread pattern may include only the rib-like land portions (that is, with no widthwise groove) in tire widthwise region accounting for 80% of the tread width TW, with the tire equator plane CI, being the center. The reason is that the drainage performance in this tire widthwise region significantly contributes to wet performance in particular.

Here, the "tread end TE" refers to the outermost position in the tire width direction in a region across the entire region in the tire circumferential direction of the contact surface which comes into contact with a road surface, in a tire mounted on a rim and filled with an internal pressure prescribed for each vehicle onto which the tire is to be mounted, and applied with a maximum load prescribed in the aforementioned industrial standards or to be determined in the future, or a load to be applied to a tire to be placed under the largest load among the four tires with the maximum number of passengers assumed in the case where the size is not recited in the aforementioned industrial standards.

The "internal pressure prescribed for each vehicle onto which the tire is to be mounted" refers to an air pressure prescribed in the aforementioned industrial standards or corresponding to the maximum applied load to be determined in future, and when the size is not recited in the aforementioned industrial standards, an air pressure corresponding to the load to be applied to a tire to be placed under the largest load among the four tires with the maximum number of passengers assumed.

The "tread width TW" refers to a distance between the tread ends TE in the tire width direction.

Further, as illustrated in FIG. 6, sipes 30 may be provided on the tread surface, so as to improve various performances.

In particular, in terms of improving wet performance, the sipes 30 each may preferably be a one-side opening sipe 30 which opens at one end thereof to the groove while terminating at the other end thereof within the land portion. The one-side opening sipes 30 can increase circumferential shearing rigidity compared with both-side opening sipes while removing water films in the contact surface by means of the one-side opening sipes 30, to thereby produce an effect of improving wet performance resulting from the improvement in circumferential shearing rigidity. For the same reason, the one-side opening sipes 30 may preferably be combined with a pattern mainly composed of the rib-like land portions 33, 34, as illustrated in FIG. 6.

Figure 7:
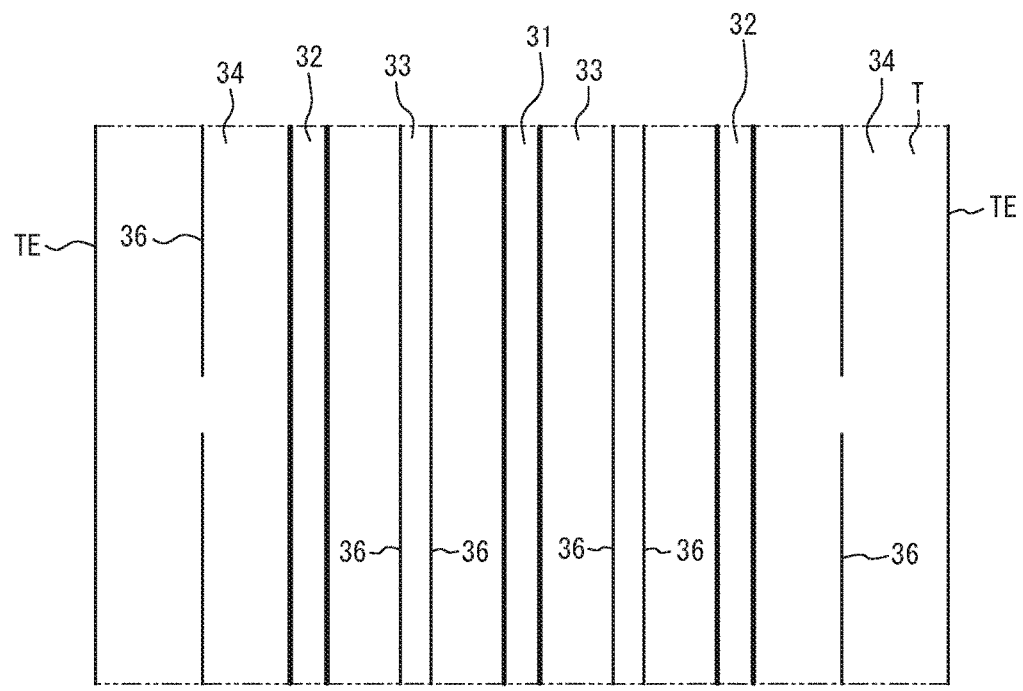
FIG. 7 is a development elevation illustrating a second example of a tread pattern of the disclosed tire according to an embodiment.

In the pneumatic tire 10 of this embodiment, in view of further improving wet performance, small holes 35 illustrated in FIG. 6 or a circumferential sipes 36 illustrated in FIG. 7 may preferably be provided in the tread surface when the tread rubber uses high rigidity rubber. The use of high rigidity rubber increases circumferential shearing rigidity, which accelerates draining of water. On the other hand, however, the effective ground contact area between the tire and the road surface may decrease to depress wet performance. In light thereof, circumferential sipes and/or small holes which reduce the compression rigidity of the rubber may be used, to thereby suppress compression rigidity of the rubber to increase the effective around contact area. Here the small holes 35 and/or the circumferential sipes 36 have an effect of reducing the circumferential shearing rigidity, which however is sufficiently small enough to maintain the wet performance improving effect resulting from the improvement in circumferential shearing rigidity.

Here, in this embodiment, in the case where the mounting direction of the tire 10 with respect to the vehicle (vehicle-mounted direction) is designated, difference may be provided to the negative ratio between the tire widthwise half portions on the inside and outside in the vehicle-mounted direction, which boarder at the tire equator plane CL.

Figure 8:
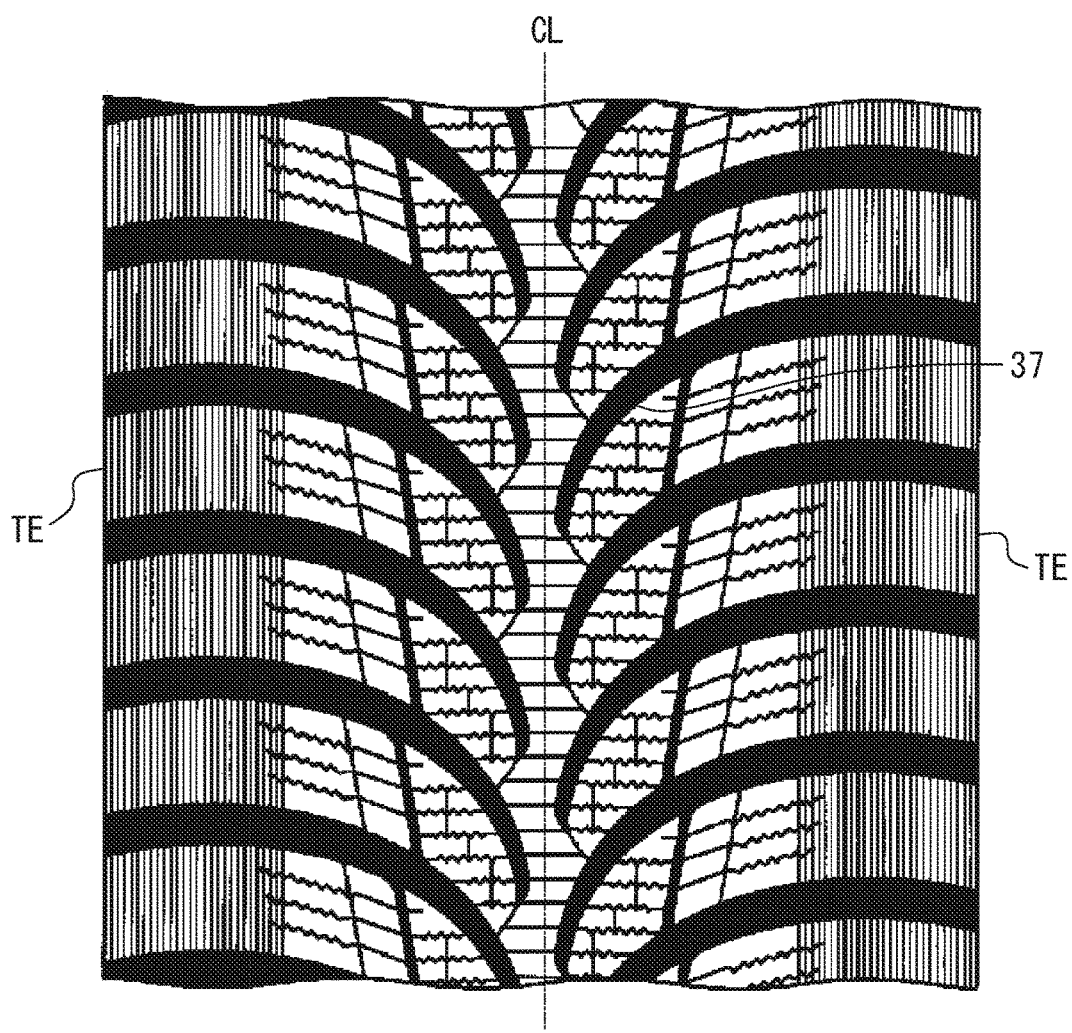
FIG. 8 is a development elevation illustrating a third example of a tread pattern of the disclosed tire according to an embodiment.

In this embodiment, as illustrated in the example of FIG. 8, the tread pattern may be configured to have a widthwise groove 37 extending from the vicinity of the tire equator plane CL to the tread end TE. In this case, the circumferential groove may optionally be omitted. The tread pattern as exemplified in FIG. 8, which is composed mainly of the widthwise grooves 37, can effectively contribute to on-snow performance in particular.

Figure 9:
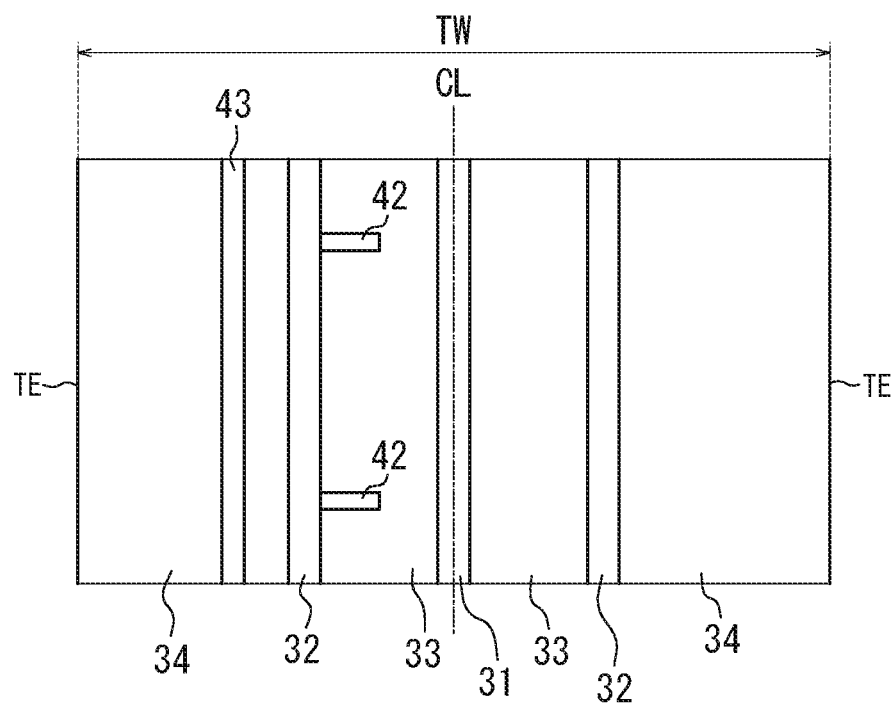
FIG. 9 is a development elevation illustrating a fourth example of a tread pattern of the disclosed tire according to an embodiment.

In this embodiment, of the rib-like land portions 33, 34 illustrated in FIGS. 6, 7, and 9, the shoulder rib-like land portion 34 partitioned by the circumferential groove 32 on the tire widthwise outermost side and the tread end TE may employ various configurations. For example, in a tire for which the vehicle-mounted direction is designated, the shoulder rib-like land portion 34 may be varied in width in the tire width direction between the vehicle-mounted direction outside and inside. Here, in consideration of the steering stability, the shoulder rib-like land portion 34 on the vehicle-mounted direction outside may preferably be larger in width than the shoulder rib-like land portion 34 on the vehicle-mounted direction inside.

In view of suppressing buckling so as to improve cornering power, the pneumatic tire 10 of this embodiment may preferably include, as illustrated in FIG. 9, one-end open grooves 42 each extending from the circumferential groove 32 to the vehicle-mounted direction inside when the tire is mounted on a vehicle. More specifically, the tire 10 may preferably include, on the tread surface, in at least one of the half portions across the tire equator plane CL as the border, the circumferential groove 32 extending in the tire circumferential direction on the tread end TIE side, the circumferential groove 32 being adjacent to the tread end TE while being spaced apart from the tread end TE in the tire width direction at a distance by 25% of the tread width TW, and at least one one-end open groove 42, in one of the rib-like land portions 33 adjacent to the shoulder rib-like land portion 34 partitioned by the circumferential groove 42 and the tread end TE, the one-end open groove 42 extending from the circumferential groove 32 on the tread end TIE side and extending in the tire width direction to remain within the land portion 33. Here, the groove 43 of FIG. 9 is a shallow groove smaller in groove depth than the circumferential groove 32.

In the case of a narrow-width, large diameter pneumatic tire as in this embodiment, the tire is subjected to compressive stress on the vehicle-mounted direction outside while subjected to tensile stress on the vehicle-mounted direction inside. The stresses cause deformation in the tread rubber, which deforms the belt so as to in advertently raise the contact surface off the ground.

Here, the tire has the one-end open groove 42 extending from the circumferential groove 32 on the tread end TE side to remain within the rib-like land portion 33. Thus, the tire is structured, on the vehicle-mounted direction outside within the rib-like land portion 33, to have the one-end open groove 42 closed under compressive stress, which can suppress deformation of the tread and belt under compressive stress, as compared with the case where the one-end open groove 42 is not provided or the one-end open groove 42 is not extended to the vehicle-mounted direction outside.

Further, the one-end open groove 42 remains within the rib-like land portion 33, and thus, as compared with the case where the one-end open groove 42 extends toward the vehicle-mounted direction inside, the tire is increased in rigidity against tensile stress on the vehicle-mounted direction inside to thereby suppress deformation of the tread and the belt.

In the pneumatic tire 10 of this embodiment, as illustrated in FIG. 1, the distance between the straight line m1 and the straight line m2 in a tire widthwise section is defined as a fall height LCR, which may preferably satisfy the ratio LCR/TW of 0.045 or less, the straight line m1 passing through a point P on the tread surface at the tire equator plane CL while being parallel to the tire width direction, the straight line m2 passing through the tread end TE while being parallel to the tire width direction. With the ratio LCR/TW being defined to fall within the aforementioned range, the tire 10 has a crown portion flattened (planarized) to increase the contact area, alleviating an input (pressure) from the road surface to reduce the deflection rate in the tire radial direction, to thereby improve the tire in durability and wear resistance.

In the pneumatic tire 10 of this embodiment, a highly-elastic rubber may preferably be used as the tread rubber in terms of improving wet performance. This is in contrast with a pneumatic tire in a conventional size which rather uses a low-elastic rubber to improve wet performance. A conceivable reason is that the pneumatic tire 10 of this embodiment, which is in a narrow-width, large-diameter size, has a narrow contact width and also has a high contact pressure in use with high internal pressure in particular, which may increase circumferential shearing rigidity, to thereby improve grounding performance on a wet road.

The highly-elastic rubber may preferably have a dynamic storage elastic modulus E' at 30° C. specifically in a range of 6.0 MPa to 12.0 MPa. The use of rubber satisfying the range may further improve wet performance in the pneumatic tire 10. Further, the tread rubber may preferably have the loss tangent tan δ at 60° C. falling within a range of 0.05 to 0.15. The tread rubber satisfying the range may further reduce rolling resistance.

In this embodiment, in addition to the tread rubber using the aforementioned highly-elastic rubber, a tread pattern mainly composed of the rib-like land portions 33, 34 illustrated in FIGS. 6, 7, and 9 may be used to further increase the circumferential shearing rigidity, to thereby improve wet performance.

In the tire 10 of this embodiment, the tread rubber may be formed of a plurality of different rubber layers laminated in the tire radial direction. Rubbers for use as the aforementioned plurality of rubber layers may be different from one another in such properties as tangent loss, modulus, hardness, glass transition temperature, and material. Further, the ratio of thickness in the tire radial direction of the plurality of rubber layers may vary in the tire width direction. Alternatively, the groove bottom of the circumferential grooves 31, 32 (FIG. 1), for example, may alone be formed of a rubber layer different from the surroundings.

In this embodiment, the tread rubber may be formed of a plurality of rubber layers different from one another in the tire width direction. Rubbers for use as the aforementioned plurality of rubber layers may be different from one another in such properties as tangent loss, modulus, hardness, glass transition temperature, and material. Further, the ratio of thickness in the tire radial direction of the plurality of rubber layers may vary in the tire radial direction. Alternatively, rubber layers in a limited region, such as in the vicinity of the circumferential grooves 31, 32 alone, the vicinity of the tread end TE alone, the vicinity of the shoulder land portion 34 alone, or the vicinity of the center land portion 33 alone may be formed of rubber layers different from the surroundings (FIG. 1).

According to the tire 10 of this embodiment, the inclined belt layer 18 as the widest layer in the inclined belt 16 of FIG. 1 may preferably have a tire widthwise width of 90% to 115% of the tread width TW, and particularly preferably of 100% to 105% of the tread width TW.

In this embodiment, metal cords, in particular, steel cords are the most typical examples of belt cords for use in the inclined belt layer 18 as the widest layer or in the inclined belt layer 22 as the narrowest layer constituting the inclined belt 16 of FIG. 1. However, organic fiber cords may also be used. The steel cords may include steel as a main component, and also contain various micro inclusions such as carbon, manganese, silicon, phosphorous, sulfur, copper, and chromium.

In this embodiment, belt cords for use in the inclined belt layer 18 as the widest layer or in the inclined belt layer 22 as the narrowest layer constituting the inclined belt 16 of FIG. 1 may use monofilament cords and cords obtained by twisting a plurality of filaments. Various designs may be adopted for the twist structure, which may be different in, for example, sectional structure, twist pitch, twist direction, distance of adjacent filaments. Further, cords obtained by twisting filaments of different materials may also be used, which may employ various twist structures such as single twist, layer twist, and a multi twist without being limited to any particular sectional structure.

Figure 10:
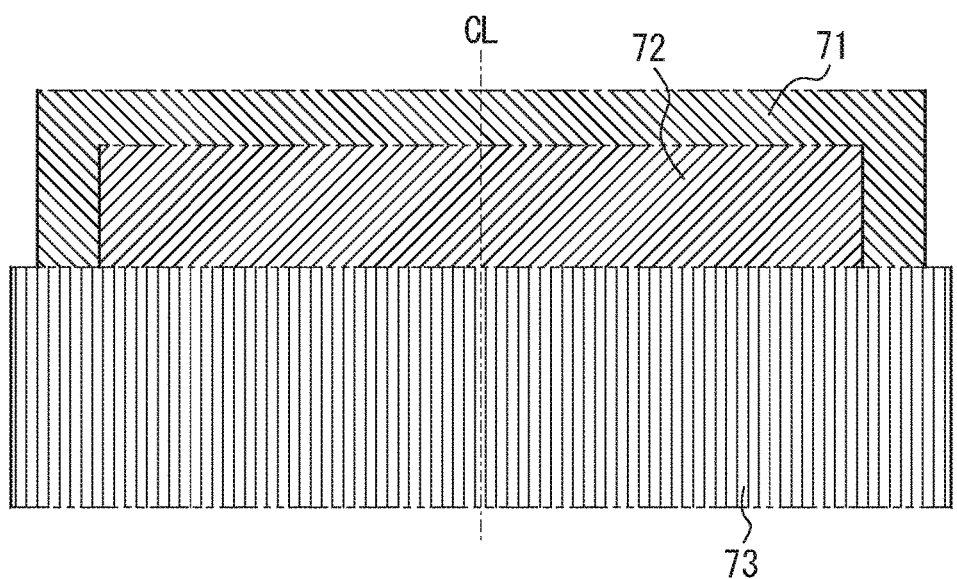
FIG. 10 is a plan view illustrating a belt structure in a second modified example of the disclosed tire of FIG. 1.

FIG. 10 schematically illustrates another example of the belt structure, in which a single-layered circumferential belt layer 73 is laminated on the tire radial outer side of two inclined belt layers 71, 72.

In the pneumatic tire of this embodiment, the circumferential belt layers 24, 25, 260, 73 of FIGS. 2, 3, and 10 may preferably be highly rigid, and more specifically, may preferably be formed of a rubberized layer of cords extending in the tire circumferential direction, which may preferably satisfy $1500 \geq X \geq 750$ where X is defined as $X = Y \times n \times m$, Y representing the Young's modulus (GPO of the cords, n representing the number of the cords (cords/50 mm), m representing the number of the circumferential belt layers 24, 24, 260, 73. The pneumatic tire 10 of this embodiment which is in a narrow-width, large-diameter size, is apt to be in a shape which is subjected to local deformation in the tire circumferential direction against input from the road surface upon cornering, such that the grounding surface is likely to be in a substantially triangular shape, that is, the contact length in the circumferential direction is largely changed depending on the position in the tire width direction. In contrast, the circumferential belt layers 24, 25, 260, 73 are formed to have high rigidity, so as to improve ring rigidity of the tire, which suppresses deformation in the tire circumferential direction, with the result that deformation in the tire width direction may also be suppressed by the incompressibility of the rubber, making the grounding shape unlikely to change. Further, the improved ring rigidity promotes eccentric deformation, which simultaneously improves rolling resistance. The effect of improving rolling resistance is particularly improved extensively in the pneumatic tire 10 of this embodiment.

Further, when the highly rigid circumferential belt layers 24, 25, 260, 73 are used as described above, belt cords of the inclined belt layers 18, 71, 72 may preferably be inclined relative to the tire circumferential direction at a high angle, specifically, of at least 35°. The use of the highly rigid circumferential belt layers 24, 25, 260, 73 increases rigidity in the tire circumferential direction, which may inadvertently reduce the contact length in some tires. In light thereof, belt layers inclined at a high angle may be used to reduce the out-of-plane flexural rigidity in the tire circumferential direction to increase the stretching of the rubber in the tire circumferential direction upon tread surface deformation, to thereby suppress reduction in contact length.

Further, in this embodiment, waved cords may be used for the circumferential belt layers 24, 25, 260, 73, in order to increase breaking strength. The breaking strength may similarly be increased by using high-elongation cords (for example, with the elongation at break of 4.5% to 5.5%).

Further, in this embodiment, various materials may be adopted as the circumferential belt layers 24, 25, 260, 73, as typically exemplified by rayon, nylon, polyethylene naphthalate (PEN), polyethylene terephthalate (PET), aramid, glass fiber, carbon fiber, steel, and the like, with organic fiber cords being particularly preferred in terms of weight reduction.

Here, in this embodiment, the circumferential belt layers 24, 25, 260, 73 may adopt, as the cords thereof, monofilament cords, cords obtained by twisting a plurality of filaments, or hybrid cords obtained by twisting filaments of different materials.

Further, in this embodiment, the number of cords of the circumferential belt layers 24, 25, 260, 73 may be in a range of 20 to 60 per 50 mm, without being limited thereto.

Further, in this embodiment, the circumferential belt layers 24, 25, 260, 73 may be provided with distributions in the tire width direction in terms of such properties as rigidity, material, the number of layers, the density of the cords. For example, the number of the circumferential belt layers 24, 25, 260, 73 may be increased, for example, only at the tire widthwise end. On the other hand, the number of the circumferential belt layers 24, 25, 260, 73 may be increased only in the center portion.

Further, in this embodiment, the circumferential belt layers 24, 25, 260, 73 may be designed to be wider or narrower than the inclined belt layers 18, 22, 71, 72. For example, the circumferential belt layers 24, 25, 260, 73 may be designed to have a width in a range of 90% to 110% of the width of the widest inclined belt layers 18, 71 largest in the tire widthwise width among the inclined belt layers 18, 22, 71, 72.

Here, the circumferential belt layers 24, 25, 260, 73 may be configured as spiral layers, which is particularly advantageous in terms of production.

Here, in this embodiment, the circumferential belt layers 24, 25, 260, 73 may optionally be omitted.

In this embodiment, the carcass line may adopt various structures. For example, the carcass 15 may have a carcass maximum width position in the tire radial direction, which may be closer to either of the bead portion 11 side or the tread portion 13 side. For example, the carcass maximum width position in the tire radial direction of the carcass 15 may be disposed on the tire radial outer side from the bead base portion, within a range of 50% to 90% of the tire section height.

Further, in this embodiment, the carcass 15 may also employ various structures. For example, the number of carcass cords constituting the carcass 15 may be in a range of 20 to 60 per 50 mm, without being limited thereto.

Figure 11:
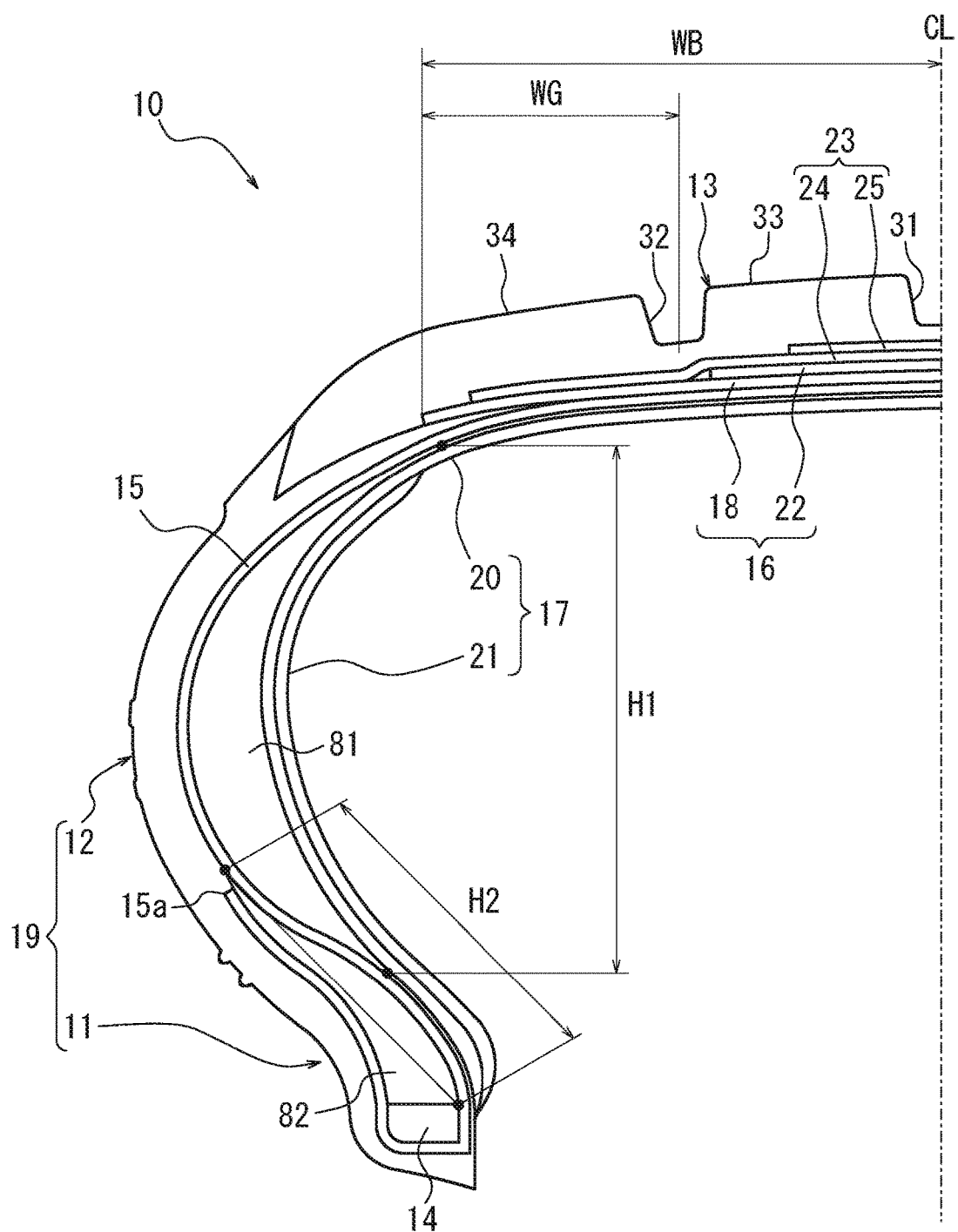
FIG. 11 is a partial sectional view in the tire width direction of the disclosed tire according to an embodiment, when the disclosed tire is a run flat tire.

Furthermore, for example, as illustrated in FIG. 11, the carcass 15 may have a folded end 15a positioned on the tire radial inner side relative to the tire radial end of a bead filler 82. Alternatively, the carcass folded end 15a may be positioned on the tire radial outer side relative to the tire radial outer side end of the bead filler 82 or the tire maximum width position in the tire radial direction, or may be extended, in some cases, to the tire widthwise inner side relative to the tire widthwise end of the inclined belt 16. Further, in the case where the carcass 15 is formed of a plurality of carcass ply layers, the folded ends of the carcass plies may be disposed at different positions in the tire radial direction. Alternatively, the carcass 15 may not include the carcass folded part in the first place; instead, the carcass 15 may be structured to be inserted between a plurality of bead core members, or wound around the bead core 14.

In the pneumatic tire 10 of this embodiment, the side portion 19 may preferably be reduced in thickness. "The side portion 19 may be reduced in thickness" in such a manner that, for example, the bead filler 82 may be configured to have a tire widthwise sectional area S1 which is 1 times or more and 4 times or less of the tire widthwise sectional area S2 of the bead core 14. Further, the sidewall portion 12 may have a gauge Ts at the tire maximum width position in the tire radial direction, and the bead core 14 may have a bead width Tb at the tire radial center position, with the ratio of Ts to Tb (Ts/Tb) falling within a range of 15% or more and 40% or less. Further, the sidewall portion 12 may have a gauge Ts at the tire maximum position in the tire radial direction, and the carcass 15 may have a carcass cord with a diameter Tc, with the ratio of Ts to Tc (Ts/Tc) being 5 or more and 10 or less. The gauge Ts is a total thickness of all the members including rubber, the carcass 15, and the inner liner 17. Further, when the tire is structured to have the bead core 14 divided into a plurality of small bead cores by the carcass 15, Tb refers to the distance between the widthwise innermost end and the outermost end portion of all the small bead cores.

In this embodiment, the tire 10 may have the tire maximum width position in the tire radial direction disposed in a range of 50% to 90% of the tire section height, on the tire radial outer side from the bead base portion.

The tire 10 of this embodiment may be structured to include a rim guard.

The tire 10 of this embodiment may be structured without optionally including the bead filler 82.

According to this embodiment, the bead core 14 may employ various structures including a cross-sectional circular shape or cross-sectional polygon shape.

In this embodiment, the bead portion 11 may further include, for example, a rubber layer and a cord layer for reinforcement purposes. These additional members may be disposed in various positions with respect to the carcass 15 and the bead filler 82.

In this embodiment, in order to reduce cavity resonance, the tire inner surface may include a porous member arranged thereon or may be treated with an electrostatic flocking process.

The tire 10 of this embodiment may optionally include, on the tire inner surface, a sealant member for preventing air leakage upon a blowout of the tire.

The pneumatic tire 10 of this embodiment may optionally be configured as a side reinforced run flat tire having a side reinforcing rubber 81 having a crescent section disposed on the side portion 19 as illustrated in FIG. 11.

As in the example of FIG. 11, in the pneumatic tire 10 of this embodiment, the side portion 19 may be simplified in structure when configured as a side reinforced run flat tire, to thereby realize both the run flat durability and the fuel efficiency. This is based on the finding that, in the case of a pneumatic run flat tire in a narrow-width, large-diameter size, the tire undergoes, during run-flat traveling, relatively small deformation in the side portion 19 and the tread portion 13 but goes through relatively large deformation from the shoulder portion to the buttress portion. Such deformation is in contrast to that a conventional size tire undergoes relatively large deformation in the side portion. Such deformation unique to a narrow-width, large-diameter tire allows the tire to have a simplified structure to sufficiently ensure run flat durability and can also improve further the fuel efficiency.

Specifically, at least any one of the following conditions (i) to (iii) may be satisfied, to thereby simplify the tire in structure.

(i) As illustrated in FIG. 11, the folded end 15a of the carcass folded part of the carcass 15 is positioned on the tire radial inner side than the tire maximum width position of the tire 10 in the tire radial direction.

(ii) The tire 10 in a reference state as being assembled to a rim and filled with a predetermined internal pressure with no load applied thereon satisfies a relation of 1.8≤H1/H2≤3.5, where H1 represents the tire radial maximum length of the side reinforcing rubber 81 in a tire widthwise section and H2 represents the length of a line segment connecting the tire radial outermost point of the bead filler 82 and the tire radial outermost point of the bead core 14. Here, as in the example of FIG. 11, when there are a plurality of line segments having the lengths H2 connecting the tire radial outermost point of the bead filler 82 and the tire radial outermost point of the bead core 14, the maximum one is used as the length H2.

(iii) The tire satisfies the relation of 10 (mm)≤(SW/OD)×H1≤20 (mm).

According to the pneumatic tire 10 of this embodiment, when the tire is configured as a side reinforced run flat tire as illustrated in FIG. 11, the circumferential groove 32 on the tire widthwise outermost side is arranged closer to the tire equator plane CL in the tire width direction, to thereby realize further improvement in run flat durability. This is based on the finding that, in the case of a pneumatic run flat tire of the example of FIG. 11 of a narrow-width, large-diameter size, the tire undergoes relatively small deformation in the side portion 19 and the tread portion 13 but goes through relatively large deformation from the shoulder portion to the buttress portion during run-flat traveling. Such deformation is in contrast to that a conventional size tire undergoes relatively large deformation in the side portion. As described above, in a narrow-width, large-diameter tire, which undergoes unique deformation, the circumferential groove 32 on the tire widthwise outermost side may be arranged closer to the tire equator plane CL, to thereby increase grounding performance from the shoulder land portion to the buttress portion in run-flat traveling, which alleviates the contact pressure. As a result, the tire can further be improved in run flat durability.

Specifically, the tire in a reference state as being assembled to a rim and filled with a predetermined internal pressure with no load applied thereon may preferably satisfy the relation of 0.5≤WG/WB≤0.8, where WB represents the half width in the tire width direction of a belt layer maximum in width in the tire width direction of the one or more belt layers forming the inclined belt 16 and WG represents a tire widthwise distance from the tire widthwise end of a belt layer maximum in width in the tire width direction to the tire widthwise center position of the circumferential groove 32 in the tire widthwise outermost side of the one or more circumferential grooves 31, 32

EXAMPLES

Next, the disclosed pneumatic tire was prototyped and subjected to performance evaluation on the rolling resistance and the in-vehicle noise, which is described in below. Pneumatic tires with the specifications shown in Table 1 were prototyped as Comparative Examples 1 to 3 and Examples 1 to 7 in the tire size of 165/60R19 (in a narrow-width, large-diameter size, with the section width SW=175 mm, the outer diameter OD=680 mm), and as Comparative Examples 4 to 6 in the tire size of 195/60R15 (in a normal size, with the section width SW=205 mm, the outer diameter OD=630 mm). Pneumatic tires of Comparative Examples 1 to 6 and pneumatic tires of Examples 1 to 7 were evaluated for in-vehicle noise and rolling resistance by the following method. The results are shown in Table 1.

(Evaluation of In-Vehicle Noise Performance)

The tires according to Comparative Examples 1 to 3 and Examples 1 to 7 were each assembled to a rim in a rim size of 5.5J-19 and the tires according to Comparative Examples 4 to 6 were each assembled to a rim in a rim size of 6.5J-15, which were each filled with an internal pressure of 300 kPa, and then rotated on a running test drum under the load of 4.28 kN at 40 km, 60 km, 80 km, 100 km per hour, so as to measure the noise level inside the vehicle for a low frequency range (80 Hz or higher and 100 Hz or lower) and for a high frequency range (400 Hz or higher and 800 Hz or lower), respectively, and the average of the measured values was calculated. Table 1 shows the result thereof as the noise variation (dB), with Comparative Example 1 as the reference. The smaller values indicate better performance in each case.

(Evaluation on Rolling Resistance Performance)

The tires according to Comparative Examples 1 to 3 and Examples 1 to 7 were each assembled to a rim in a rim size of 5.5J-19 and the tires according to Comparative Examples 4 to 6 were each assembled to a rim in a rim size of 6.5J-15, which were each filled with an internal pressure of 300 kPa, and measured for rolling resistance of the axle shaft using a drum tester (at the speed of 80 km/h) with a diameter of 1.7 in having an iron surface. The measurement of rolling resistance was carried out with a smooth drum, force method, in compliance with ISO18164. Table 1 shows the result thereof, with the value of the Comparative Example 1 being an index of 100. The smaller values indicate better performance in every case.

TABLE 1

|  | Comparative Example 1 | Comparative Example 2 | Comparative Example 3 | Comparative Example 4 | Comparative Example 5 | Comparative Example 6 | Example 1 |
|---|---|---|---|---|---|---|---|
| Inner Liner Thickness |  |  |  |  |  |  |  |
| Position | Entire Region | Entire Region | Entire Region | Entire Region | Entire Region | Entire Region | Entire Region |
| Thickness (mm) | 1 | 2 | 1 | 1 | 1 | 2 | 1.5 |
| Inclined Belt |  |  |  |  |  |  |  |
| Widest Inclined Belt Layer |  |  |  |  |  |  |  |
| $\theta_1$ | 28° | 28° | 60° | 28° | 60° | 60° | 60° |
| $W_1$ (mm) | 135 | 135 | 135 | 160 | 160 | 160 | 135 |
| Narrowest Inclined Belt Layer |  |  |  |  |  |  |  |
| $\theta_2$ | 28° | 28° | 60° | 28° | 60° | 60° | 60° |
| $W_2$ (mm) | 130 | 130 | 130 | 150 | 150 | 150 | 130 |
| Circumferential Belt |  |  |  |  |  |  |  |
| Number of Layers | 1 | 1 | 1 | 1 | 1 | 1 | 1 |
| Material *1 | Hybrid Cords | Hybrid Cords | Hybrid Cords | Hybrid Cords | Hybrid Cords | Hybrid Cords | Hybrid Cords |
| Widest Circumferential Belt Layer Width W3 (mm) *2 | 128 | 128 | 128 | 170 | 170 | 170 | 128 |
| Narrowest Circumferential Belt Layer Width W3 (mm) *2 | — | — | — | — | — | — | — |
| Tire Size | Narrow-Width, Large-Diameter Size | Narrow-Width, Large-Diameter Size | Narrow-Width, Large-Diameter Size | Normal Size | Normal Size | Normal Size | Narrow-Width, Large-Diameter Size |
| In-Vehicle Noise Performance |  |  |  |  |  |  |  |
| Low Frequency Range (80-100 Hz) | 0.0 dB | −0.5 dB | 0.0 dB | −0.5 dB | −0.5 dB | −1.5 dB | −0.3 dB |
| High Frequency Range (400-800 Hz) | 0.0 dB | 0.0 dB | +1.5 dB | — | +1.5 dB | +1.5 dB | +1.5 dB |
| Rolling Resistance Performance | 100 | 108 | 90 | 115 | 109 | 112 | 91 |

TABLE 1-continued

|  | Example 2 | Example 3 | Example 4 | Example 5 | Example 6 | Example 7 |
|---|---|---|---|---|---|---|
| Inner Liner Thickness |  |  |  |  |  |  |
| Position | Entire Region | Entire Region | Entire Region | Below Belt/ from Side Portion to Buttress | Entire Region | Entire Region |
| Thickness (mm) | 2 | 2.8 | 3 | 2/3 | 2 | 2 |
| Inclined Belt |  |  |  |  |  |  |
| Widest Inclined Belt Layer |  |  |  |  |  |  |
| $0_1$ | 60° | 60° | 60° | 60° | 45° | 45° |
| $W_1$ (mm) | 135 | 135 | 135 | 135 | 135 | 135 |
| Narrowest Inclined Belt Layer |  |  |  |  |  |  |
| $0_2$ | 60° | 60° | 60° | 60° | 16° | 16° |
| $W_2$ (mm) | 130 | 130 | 130 | 130 | 75 | 75 |
| Circumferential Belt |  |  |  |  |  |  |
| Number of Layers | 1 | 1 | 1 | 1 | 1 | 2 |
| Material *1 | Hybrid Cords | Hybrid Cords | Hybrid Cords | Hybrid Cords | Hybrid Cords | Hybrid Cords |
| Widest Circumferential Belt Layer Width W3 (mm) *2 | 128 | 128 | 128 | 128 | 128 | 128 |
| Narrowest Circumferential Belt Layer Width W3 (mm) *2 | — | — | — | — | — | 40 |
| Tire Size | Narrow-Width, Large-Diameter Size | Narrow-Width, Large-Diameter Size | Narrow-Width, Large-Diameter Size | Narrow-Width, Large-Diameter Size | Narrow-Width, Large-Diameter Size | Narrow-Width, Large-Diameter Size |
| In-Vehicle Noise Performance |  |  |  |  |  |  |
| Low Frequency Range (80-100 Hz) | −0.5 dB | −1.0 dB | −1.5 dB | −1.0 dB | −0.5 dB | −0.5 dB |
| High Frequency Range (400-800 Hz) | +1.5 dB | +1.5 dB | +1.5 dB | +1.5 dB | 0.0 dB | 0.0 dB |
| Rolling Resistance Performance | 92 | 98 | 103 | 94 | 90 | 90 |

In Table 1, the hybrid cords as the material *1 are hybrid cords of aramid as an organic fiber and nylon, and *2 is the tire widthwise width.

As shown in Table 1, Comparative Examples 2, 4 to 6 are improved in noise performance in the low frequency range as compared with Comparative Example 1, but reduced in rolling resistance performance. Comparative Example 3 is improved in rolling resistance performance as compared with Comparative Example 1, but reduced in noise performance in the high frequency range. On the other hand, in Examples 1 to 7 are improved in noise performance at least in the low frequency range as compared with Comparative Example 1, with the rolling resistance performance still being better than or equal to that of Comparative Example 1. Thus, the disclosed pneumatic tire is capable of reducing noise while suppressing potential increase in rolling resistance performance.

Further, Example 6 is better than Example 1 in noise performance in the high frequency range, which indicates that the narrowest inclined belt layer having the inclined angle relative to the circumferential direction and the tire widthwise width disposed as described above can also improve noise performance even in the high frequency range. Further, Example 7 is better than Example 1 in noise performance in the high frequency range. Accordingly, a circumferential belt to be provided in the central region may be increased in circumferential rigidity than other regions, to thereby improve noise performance even in the high frequency range.

REFERENCE SIGNS LIST 10 pneumatic tire
11 bead portion
12 sidewall portion
13 tread portion
14 bead core
15 carcass
15a folded end of the folded part of the carcass
16 inclined belt
17 inner liner
18 widest inclined belt layer
19 side portion
20 first inner liner rubber
21 second inner liner rubber
22 narrowest inclined belt layer
23, 230 circumferential belt
24 widest circumferential belt layer
2 narrowest circumferential belt layer
30 sipe
31, 32 circumferential groove
33, 34 rib-like land portion
35 small hole 36 circumferential sipe
37 widthwise groove
42 one end open groove
43 shallow groove
71, 72 inclined belt layer
73 circumferential belt layer
81 side reinforcing rubber
82 bead filler
260 circumferential belt layer
CA central region
CL tire equator plane
TE tread end

The invention claimed is:

1. A pneumatic tire, comprising:
a carcass extending across a pair of bead portions;
an inclined belt which is disposed on the tire radial outer side of a crown portion of the carcass and includes inclined belt layers each having cords extending as being inclined with respect to the tire circumferential direction; and
an inner liner disposed on the inside of the carcass, wherein:
the inner liner has a thickness of 1.5 mm or more at least in part of a side portion of the tire;
the inclined belt layers include at least one inclined belt layer that has cords inclined at an inclination angle of 35° or more with respect to the tire circumferential direction,
the pneumatic tire has a section width SW and an outer diameter OD which satisfy the following relationships when an internal pressure of the pneumatic tire is 250 kPa or higher;
when the section width SW of the pneumatic tire is less than 165 mm, SW/OD is 0.26 or less, and
when the section width SW of the pneumatic tire is 165 mm or larger, the outer diameter OD satisfies OD≥2.135×SW+282.3,
a rubber composition forming the inner liner has an air permeability coefficient of $1.0 \times 10^{-14}$ cc-cm/(cm²-s-cm-Hg) ore more and $6.5 \times 10^{-10}$ cc-cm/(cm²-s-cm-Hg) or less,
the rubber composition forming the inner liner has a dynamic storage elastic modulus E' at −40° C. of 500 MPa or higher and 8000 MPa or lower,
the rubber composition forming the inner liner has a loss tangent (tan δ) of 0.1 or more and 0.3 or less,
a tread rubber of the pneumatic tire has a dynamic storage elastic modulus E' at 30° C. in a range of 6.0 MPa to 12.0 MPa, and
the tread rubber has a loss tangent (tan δ) at 60° C. within a range of 0.05 to 0.15.

2. The pneumatic tire according to claim 1, wherein the inner liner has a thickness of 2.8 mm or less.

3. The pneumatic tire according to claim 1, wherein the inner liner has a thickness, at least in part of the side portion, larger than the thickness thereof in the rest of the side portion.

4. The pneumatic tire according to claim 1, wherein:
the inclined belt has at least two layers of the inclined belt layers different in width in the tire width direction, of which the widest inclined belt layer has cords inclined at an inclination angle $\theta_1$ with respect to the tire circumferential direction and the narrowest inclined belt layer has cords inclined at an inclination angle $\theta_2$ with respect to the tire circumferential direction, the inclination angles $\theta_1$ and $\theta_2$ satisfying:
$35° \leq \theta_1 \leq 85°$; and
$10° \leq \theta_2 \leq 30°$, and
the widest inclined belt layer has a tire widthwise width $W_1$ and the narrowest inclined belt layer has a tire widthwise width $W_2$, the widths $W_1$ and $W_2$ satisfying:
$W_2 \leq 0.6 \times W_1$.

5. The pneumatic tire according to claim 1, further comprising a circumferential belt which is disposed on the tire radial outer side of the crown portion of the carcass and includes at least one circumferential belt layer having cords extending along the tire circumferential direction, wherein:
the circumferential belt has a tire circumferential rigidity per unit width that is higher in a central region including the tire equator plane, than the tire circumferential rigidity per unit width in other regions.

6. The pneumatic tire according to claim 5, wherein a width $W_3$ of the circumferential belt and a width $W_4$ of the central region satisfies:
$0.2 \times W_3 \leq W_4 \leq 0.6 \times W_3$.

7. The pneumatic tire according to claim 1, wherein a groove volume ratio of total volume of grooves formed in a tread surface of the pneumatic tire (V2) to the volume of the tread rubber (V1) satisfies:
$V2/V1 \leq 0.2$.

8. The pneumatic tire according to claim 1, wherein the pneumatic tire includes on a tread surface only rib-like land portions, with no widthwise grooves, in a tire widthwise region accounting for 80% of the tread width TW.

9. The pneumatic tire according to claim 1, wherein the pneumatic tire includes, on a tread surface:
a plurality of land portions including a shoulder land portion, and an inner land portion adjacent to the shoulder land portion and closer to a centerline of the pneumatic tire;
a circumferential groove extending in the tire circumferential direction on a tread end TE side, the circumferential groove being adjacent to the tread end TE while being spaced apart from the tread end TE in the tire width direction at a distance by 25% of a tread width TW, and
at least one one-end open groove, in the inner land portion, the one-end open groove extending from the circumferential groove on the tread end TE side and extending in the tire width direction towards the centerline of the pneumatic tire.

10. The pneumatic tire according to claim 1, wherein in a tire widthwise section,
wherein a fall height LCR is defined as a distance between a straight line m1 and a straight line m2, the straight line m1 passing through a point P on a tread surface at a tire equator plane CL while being parallel to the tire width direction, and the straight line m2 passing through a tread end TE while being parallel to the tire width direction, and
the fall height LCR and a tread width TW satisfy a ratio of $LCR/TW \leq 0.045$.

11. The pneumatic tire according to claim 4, wherein the widest inclined belt layer has a tire widthwise width of 90% to 115% of a tread width TW.

12. The pneumatic tire according to claim 1, further comprising a bead core and a bead filler located adjacent to the bead core,
wherein the bead filler has a tire widthwise sectional area S1 which is within a range of equal to or more than, and 4 times or less of, the tire widthwise sectional area S2 of the bead core.

13. The pneumatic tire according to claim 1, wherein the pneumatic tire comprises a sidewall portion and a bead core, and
   wherein the sidewall portion has a gauge Ts at a tire maximum width position in the tire radial direction, and the bead core has a bead width Tb at its tire radial center position, and
   a ratio of Ts to Tb (Ts/Tb) is within a range of 0.15 or more to 0.40 or less.

14. The pneumatic tire according to claim 1, wherein the pneumatic tire comprises a sidewall portion, and
   the sidewall portion has a gauge Ts at a tire maximum position in the tire radial direction, and the carcass has a carcass cord with a diameter Tc, and
   wherein a ratio of Ts to Tc (Ts/Tc) is within a range of 5 or more to 10 or less.

15. The pneumatic tire according to claim 1, wherein the pneumatic tire has a tire maximum width position in the tire radial direction disposed in a range of 50% to 90% of a tire section height, on the tire radial outer side from a bead base portion.

\* \* \* \* \*